United States Patent [19]

Herman et al.

[11] 4,088,713

[45] May 9, 1978

[54] THERMOPLASTIC POLYMER BLENDS COMPRISING EPDM AND EP

[75] Inventors: Richard Michael Herman, Elyria; Martin Batiuk, Grafton, both of Ohio

[73] Assignee: The B. F. Goodrich Company, Akron, Ohio

[21] Appl. No.: 811,519

[22] Filed: Jun. 30, 1977

[51] Int. Cl.$^2$ ............................................. C08L 23/16
[52] U.S. Cl. ......................... 260/897 A; 260/31.8 PQ; 260/33.6 AQ; 260/33.6 PQ; 260/848
[58] Field of Search ..................................... 260/897 A

[56] References Cited

U.S. PATENT DOCUMENTS

| | | | |
|---|---|---|---|
| 3,468,979 | 9/1969 | Hamed et al. | 260/897 A |
| 3,682,767 | 8/1972 | Britton et al. | 260/897 A |

*Primary Examiner*—Carman J. Seccuro
*Attorney, Agent, or Firm*—Charles A. Crehore

[57] ABSTRACT

Certain thermoplastic polymer blends have tensile strengths greater than that of any one polymer component. The blends comprise (1) at least one ethylene-propylene-diene (EPDM) polymer, (2) at least one ethylene-propylene (EP) polymer, and (3) optionally, at least one polyethylene. The EPDM and EP polymers each have ethylene content, unstretched crystallinity, and Mooney viscosity within a specific range. The blends are prepared by mixing physically the polymer components under heat and shear conditions. No curing or crosslinking agents are needed to obtain the superior tensile strengths of the thermoplastic blends. The blends are useful to prepare tubing, wire and cable insulation, molded items and the like.

11 Claims, No Drawings

THERMOPLASTIC POLYMER BLENDS COMPRISING EPDM AND EP

BACKGROUND OF THE INVENTION

Polymer blends of ethylene-propylene (EP) polymers or of ethylene-propylene-diene (EPDM) polymers with α-monoolefin polymers, particularly with polyethylenes, are known in the art (see U.S. Pat. Nos. 3,176,052; 3,328,486; 3,361,850 and 3,751,521). At times, curing or crosslinking agents are added to effect chemical changes in the nature of the blend (see U.S. Pat. Nos. 3,564,080 and 3,806,558). Polymer blends described in U.S. Pat. Nos. 3,785,643 and 3,806,558 are stated to be thermoplastic in nature. They are prepared by partially crosslinking the polymers, particularly the EPDM polymers.

U.S. Pat. No. 3,835,201 is directed to blends of EPDM or EP polymers having high zero shear viscosity, together with a polyolefin resin (such as polyethylene, polypropylene or a crystalline EP copolymer). U.S. Pat. No. 3,741,924 teaches blends of an EPDM polymer, an ethylene-α-olefin copolymer and a tackifier. U.S. Pat. No. 3,906,056 discloses blends of an EPDM rubber and an amorphous EP block copolymer. Finally, U.S. Pat. No. 3,919,358 teaches blends having superior tensile strength comprising an EPDM polymer having a high degree of unstretched crystallinity, together with a polyethylene.

The polymer blends of the present invention are thermoplastic in nature, and do not require curing or crosslinking agents in their preparation. Additionally, the tensile strengths of the blends of the present invention are superior to that predicted from the individual contributive effects of the polymer components, i.e., greater than any one polymer component of the blends. Such blend properties are attainable using EPDM and EP polymer components having specific ranges of ethylene content, unstretched crystallinity, and Mooney viscosity. Blend tensile strengths may be improved further by including therein at least one polyethylene.

SUMMARY OF THE INVENTION

Certain thermoplastic polymer blends have tensile strengths greater than that of any one polymer component. The blends comprise (1) at least one ethylene-propylenediene (EPDM) polymer containing about 63 to about 85 wt% ethylene, and having an unstretched crystallinity from about 1 to about 20 wt.%, and a Mooney viscosity from about 25 to about 110 (ML 1+8 at 125° C.), (2) at least one ethylene-propylene (EP) copolymer having ethylene content, unstretched crystallinity and Mooney viscosity within the above ranges, and (3) optionally, at least one polyethylene (PE). No curing or crosslinking agents are needed to obtain the superior tensile strengths of the thermoplastic blends.

DETAILED DESCRIPTION

The thermoplastic polymer blends of this invention comprise a physical mixture of two polymer components and, optionally, a third polymer component; i.e., (1) at least one ethylene-propylene-diene (EPDM) polymer containing about 63 to about 85 wt.% ethylene, and having an unstretched crystallinity from about 1 to about 20 wt.%, and a Mooney viscosity from about 25 to about 110 (ML 1+8 at 125° C.), (2) at least one ethylene-propylene (EP) copolymer having ethylene content, unstretched crystallinity, and Mooney viscosity within the above ranges, and (3) optionally, at least one polyethylene (PE).

The above polymers are mixed in a range from about 5 weight parts to about 500 weight parts of EP copolymer per 100 weight parts of EPDM polymer. Similarly, PE when used may be mixed in a range from about 5 weight parts to about 200 weight parts per 100 weight parts of EPDM polymer. Excellent results are obtained using a range of EP copolymer from about 20 weight parts to about 300 weight parts per 100 weight parts of EPDM. Excellent results also are obtained using PE as an optional third polymeric blend component in a range from about 10 weight parts to about 100 weight parts per 100 weight parts of EPDM.

The polymer blends are truly thermoplastic, having excellent strength and structural stability at ambient temperatures, as well as easy processability at temperatures above about 120° C. A smooth roll is formed in milling operations at such temperatures, and the blends are readily extrudable and moldable, having good flow properties. Formed items made from the blends are reprocessable. In contrast to the thermoplastic blends disclosed in U.S. Pat. Nos. 3,785,643 and 3,806,558, the polymer blends of the present invention do not need curing or crosslinking agents to effect partial cure of the polymer components, particularly the EPDM polymer.

Ethylene-Propylene-Diene (EPDM) Polymers

The ethylene-propylene-diene (EPDM) polymers employed have unstretched crystallinity ranging from about 1% to about 20% based upon the weight of the EPDM polymer, as well as Mooney viscosity from about 25 to about 110 (ML 1+8 at 125° C.). The unstretched crystallinity of the EPDM polymers is measured using a known X-ray technique described by Natta et al, 8 Atti Accad-Nazi. Rend. 11 (1957). The exact method used herein comprises pressing a 0.020 inch thick film of an EPDM polymer at 120° C. and 20,000 psi. The film is cooled quickly (quenched), annealed at room temperature for at least 24 hours, mounted and exposed to X-rays, with a diffraction scan being made across an angular range. Using a diffractometer, a plot is made of the angular distribution of the radiation scattered by the film. This plot is seen as a diffraction pattern of sharp crystalline peaks superimposed upon an amorphous peak. A quantitative value of weight percent crystallinity is obtained by dividing the crystalline diffraction area by the total diffraction area of the plot.

The EPDM polymers used in the present invention also may exhibit a melt endotherm from about 1 to about 15 calories/gram, preferably from about 2 to about 10 calories/gram. The melt endotherm is measured using a Differential Scanning Calorimeter (DSC) sold by the Perkin-Elmer Corporation as the Perkin-Elmer DSC-2. The test measures heat of fusion within the polymer. A completely amorphous EPDM terpolymer would have a zero melt endotherm. The test consists of placing a polymer sample of known weight, which has been annealed at room temperature for at least 24 hours, in a closed aluminum pan (DSC cell calorimeter pans were used). The polymer sample in the pan is heated at a rate of 10° C./minute over a temperature range from −100° C. to +140° C. The reference material is glass beads. The DSC chart is precalibrated, using metals having known heats of fusion, in order to provide a chart having a unit area in terms of calories/square inch/minute. As the polymer sample is heated, a crystalline melt point peak appears on the chart. The area under the crystalline melt point peak is measured, and the melt endotherm in calories/gram is calculated from the area obtained. Two melt endotherm measurements can be obtained from one test, i.e., a measurement on heating the sample and a measurement on cooling the sample.

The EPDM polymers used comprise interpolymerized units of ethylene, propylene and diene monomers. Ethylene constitutes from about 63 wt.% to about 85 wt.% of the polymer, propylene from about 5 wt.% to about 37 wt.%, and the diene from about 1 wt.% to about 15 wt.%, all based upon the total weight of EPDM polymer. Preferably, ethylene comprises from about 68 wt.% to about 78 wt.%, propylene from about 17 wt.% to about 31 wt.%, and the diene from about 2 wt.% to about 10 wt.% of the EPDM polymer. Suitable diene monomers include conjugated dienes such as butadiene, isoprene, chloroprene, and the like; nonconjugated dienes containing from 5 to about 25 carbon atoms such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclononadienes such as 3-methylbicyclo- (4,2,1)-nona-3,7-diene, and the like; indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclo dienes such as 3-methyltricyclo $(5,2,1,0^{2,6})$ -deca-3,8-diene and the like. More preferred dienes include the nonconjugated dienes. The type of diene monomer used in not critical as long as the EPDM polymer has the ethylene content, unstretched crystallinity, and Mooney viscosity defined heretofore. Excellent results were obtained using alkenyl norbornenes and nonconjugated dienes, specifically 5-ethylidene-2-norbornene and 1,4-hexadiene.

The EPDM polymers can be prepared readily following known suspension and solution techniques, such as those described in U.S. Pat. No. 3,464,169 and in Friedlander, Encyclopedia of Polymer Science and Technology, Vol. 6 pp. 338–386 (New York, 1967). The EPDM polymers are high molecular weight, solid elastomers. They typically have a dilute solution viscosity (DSV) from about 1.3 to about 3 measured at 25° C. as a solution of 0.1 gram of EPDM polymer per deciliter of toluene. The raw polymers may have typical green tensile strengths from about 800 psi to about 1,800 psi, more typically from about 900 psi to about 1,600 psi, and an elongation at break of at least about 600 percent.

Ethylene-Propylene (EP) Polymers

The ethylene-propylene (EP) polymers employed in the present invention comprise interpolymerized units of ethylene and propylene. Ethylene constitutes from about 63 wt.% to about 85 wt.% of the polymer and propylene from about 15 wt.% to about 37 wt.%, based upon the total weight of EP polymer. The EP polymers also have unstretched crystallinity as defined heretofore from about 1 to about 20 wt.% based upon EP polymer weight, as well as Mooney viscosity from about 25 to about 110 (ML 1+8 at 125° C.).

The EP polymers can be prepared readily following known suspension and solution techniques, such as those described in U.S. Pat. No. 3,646,169 and the Friedlander article cited heretofore. The polymers also may exhibit a melt endotherm from about 1 to about 15 calories/gram, more preferably from about 2 to about 10 calories/gram, measured by the technique described heretofore. The EP polymers typically have a dilute solution viscosity (DSV) from about 1.3 to about 3 measured at 25° C. as a solution of 0.1 gram of EP polymer per deciliter of toluene. The raw polymers may have typical green tensile strengths from about 300 psi to about 1,800 psi, more typically from about 500 psi to about 1,500 psi, and an elongation at break of at least about 600 percent. As mentioned heretofore, the EP copolymers are used in the blends at a level from about 5 weight parts to about 500 weight parts per 100 weight parts of EPDM polymer. Particularly good results are obtained when the EP copolymers are used at about 20 weight parts to about 300 weight parts per 100 weight parts of EPDM polymer.

Polyethylene

The polyethylene (PE) used as an optional third component in the blend can be a low density (e.g., about 0.910–0.925 grams/cc), medium density (e.g., about 0.926–0.940 grams/cc) or high density (e.g., about 0.941–0.965 grams/cc) polyethylene. The low density polyethylene are preferred. The polyethylenes may have a melt index from about 0.2 grams/10 minutes to about 30 grams/10 minutes, measured at 190° C. under a 2.16 kilogram load. If a low density polyethylene is used, the melt index is preferably between about 0.2 grams/10 minutes and about 7 grams/10 minutes. The polyethylenes are available commercially and can be prepared readily using standard polymerization techniques known in the art. As mentioned before, the polyethylenes may be used at a level from about 5 weight parts to about 200 weight parts per 100 weight parts of EPDM polymer, more preferably about 10 weight parts to about 100 weight parts per 100 weight parts of EPDM polymer.

Thermoplastic Polymer Blends

The compositions of the invention comprise thermoplastic physical blends of (1) at least one EPDM polymer, (2) at least one ethylene-propylene (EP) polymer, and (3) optionally, at least one polyethylene (PE), all of which have been described heretofore. No curing or crosslinking agents are needed, but they may be used. It was unexpected that the thermoplastic polymer blends of the defined EPDM and EP polymers would exhibit tensile strengths greater than that of either component alone. It was also unexpected that the three-component blends of EPDM polymers, EP polymers and polyethylenes would also demonstrate even greater enhanced tensile strengths. Moreover, the polymer blends of this invention are truly thermoplastic; they are moldable and remoldable at temperatures above about 120° C., preferably from about 140° C. to 200° C., yet they are strong, flexible solids at room temperature.

A wide range of rubber and plastic compounding ingredients are mixed readily with the thermoplastic polymer blends using mixing equipment such as two-roll mills, extruders, Banbury mixers, and the like. Standard mixing and addition techniques are used. In some cases, the addition of compounding ingredients, particularly waxes, plasticizers, and extenders, can detract from the overall tensile strength of the thermoplastic blends. In contrast, reinforcing fillers such as fumed silica provide increased tensile strength to the blends.

Examples of suitable compounding ingredients include metal oxides such as zinc, calcium, and magnesium oxide, lead monoxide and dioxide, fatty acids such as stearic and lauric acid, and salts thereof such as cadmium, zinc and copper stearate and lead oleate; fillers such as the carbon blacks including channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like, plasticizers and extenders such as dialkyl and diaryl organic acids like diisobutyl, dissooctyl, diisodecyl, and dibenzyl oleates, stearates, sebacates, azelates, phthalates, and the like; ASTM type 2 petroleum oils, ASTM D2226 aromatic, naphthalenic and paraffinic oils, castor oil, tall oil, glycerin and the like; antioxidants, antiozonants, and stabilizers such as di-$\beta$-naphthyl-p-phenylenediamine, phenyl-$\beta$-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethyl-phenol, 4,4'-butylidenebis-(6-t-butyl-m-cresol), 2-(4-hydroxy-3,5-t-butylaniline) 4,6-bis(octylthio)-1,3,5-triazine, hexahydro-1,3,5-tris-$\beta$-(3,5-di-t-butyl-4-hydroxyphenyl)-propionyl-s-triazine, tris-(3,5-di-t-butyl-4-hydroxybenzyl)isocyanurate, tetrakismethylene-3-(3',5'-di-t-butyl-4'-hydroxyphenyl) propionate methane, distearyl thiodipropionate, dilauryl thiodipropionate, tri(nonylated-phenyl)phosphite, and the like; and other ingredients such as pigments, tackifiers, flame retardants, fungicides, and the like. Such ingredients are used in levels well known to those skilled in the art.

Applications for the thermoplastic polymer blends include tubing, wire and cable insulation, molded items such as shoe soles and kitchen ware, mats, liners, and the like.

The following examples illustrate the present invention more fully. Unless otherwise stated, the ingredients recited in the recipes are in units of parts by weight.

EXAMPLES

General Mixing Procedure and Sample Procedure

The polymeric components of the blends, along with compounding ingredients (if used), were mixed together using a 3-inch or 6-inch, two-roll mill. Front roll temperature was about 160° C., with the back roll slightly cooler. The EPDM polymer was banded on the mill, and the other polymeric and compounding (if used) ingredients were added to the banded polymer. Mill time was about 5 minutes.

The mixing conditions described above are not critical. The important factor is to achieve uniform dispersion of the polymers and ingredients in the thermoplastic blend. This object can be accomplished using other equipment, such as a Banbury mixer, by mixing at other temperatures and for other times, and the like. Such conditions and procedures are well known to the person skilled in the art. The above conditions were used to achieve thorough mixing, and are outlined to illustrate preparation of the physical blends of the examples.

Test Methods

Stress-strain properties (i.e., tensile, modulus and elongation) were tested following the procedure in ASTM D638 using a Type IV dumbbell and a pull rate of 20 inches/minute. Although not reported in the following examples, modulus and elongation data were within acceptable limits. Ethylene, propylene and diene contents of the polymers were determined by infrared spectroscopy. Unstretched crystallinity was tested as described heretofore using the general method of Natta et al, 8 Atti Accad-Nazi. Lincei. Rend. 11 (1957). Mooney viscosity was measured at 100° C. and/or 150° C. using a large rotor, a one-minute warm-up time, and an 8-minute shearing time, and the results were interpolated to 125° C. using a known interpolation chart.

Materials

Table I contains a list of EPDM and EP polymers suitable for use in the thermoplastic polymer blends of this invention. All EPDM and EP polymers in Table I have an ethylene content from about 63 wt.% to about 85 wt.%, an unstretched crystallinity from about 1 to about 20 wt.%, and a Mooney viscosity from about 25 to about 110 (ML 1+8 at 125° C.). The following examples demonstrate that blends made from such polymers (optionally together with at least one polyethylene) have unexpectedly superior tensile strengths greater than the tensile strength of any blend component alone.

On the other hand, Table II contains a list of EPDM and EP polymers not suitable for use in the present invention. One or more of three properties (ethylene content, unstretched crystallinity and/or Mooney viscosity) is outside the ranges specified above. In particular, EPDM-11 has low ethylene content and no unstretched crystallinity (i.e., it is amorphous). EP-12 has low Mooney viscosity. EP-13, EP-14, and EP-15 all have low ethylene content and no unstretched crystallinity.

TABLE I

Raw Polymer Data

| Polymer | Wt. Percent Monomers | | | Weight Percent Crystallinity Range | Mooney Viscosity ML 1+8 (125 20 C.) |
|---|---|---|---|---|---|
| | Ethylene | Propylene | Diene | | |
| EPDM-1 | 72 | 24 | 4* | 1–15 | 50 |
| EPDM-2 | 70 | 26 | 4* | 2–7 | 50 |
| EP-3 | 67 | 33 | 0 | 2–7 | 36 |
| EP-4 | 67 | 33 | 0 | 5–10 | 43 |
| EP-5 | 67 | 33 | 0 | — | 36 |
| EP-6 | 75 | 25 | 0 | 10–15 | 40 |
| EP-7 | 74 | 26 | 0 | 10–15 | 50 |
| EP-8 | 70 | 30 | 0 | 10–15 | 92 |
| EP-9 | 73 | 27 | 0 | 10–20 | 25 |

*5-Ethylidene-2-norbornene as termonomer.

TABLE II

Raw Polymer Data

| Polymer | Wt. Percent Monomers | | | Weight Percent Crystallinity Range | Mooney Viscosity ML 1+8 (125° C.) |
|---|---|---|---|---|---|
| | Ethylene | Propylene | Diene | | |
| EPDM-11 | 55 | 42 | 3* | 0 | 55 |
| EP-12 | 67 | 33 | 0 | 1–5 | 19 |
| EP-13 | 50 | 50 | 0 | 0 | 32 |
| EP-14 | 45 | 55 | 0 | 0 | 25 |
| EP-15 | 60 | 40 | 0 | 0 | 37 |

*1,4-Hexadiene as termonomer.

EXAMPLES 1–4

In each of examples 1–4 the tensile strength of the blend is higher than predicted, i.e., higher than any one polymer component. All EPDM and EP polymers had ethylene content within the required 63–85 wt.% range, unstretched crystallinity within the required 1–20 wt.% range, and Mooney viscosity within the required 25–110 range (ML 1+8 at 125° C.).

Test data is summarized in Table III.

TABLE III

EPDM-EP Blends

| | Tensile Strength of Polymer, psi | Blend Number | | | |
|---|---|---|---|---|---|
| | | 1 | 2 | 3 | 4 |
| EPDM-1 | 1590 | 100 | 100 | 100 | 100 |
| EP-3 | 375 | 25 | — | — | — |
| EP-4 | 800 | — | 50 | — | — |
| EP-5 | 675 | — | — | 100 | — |
| EP-6 | 1500 | — | — | — | 50 |
| Blend | | | | | |
| Tensile Strength, psi | — | 1850 | 2120 | 1700 | 2750 |
| Greater than Predicted | — | yes | yes | yes | yes |

EXAMPLES 5–11

In each of Examples 5–7 the tensile strength of the blend is higher than predicted, i.e., higher than either polymer component. All EPDM and EP polymers in examples 5–7 has ethylene content, unstretched crystallinity and Mooney viscosity within ranges specified heretofore.

In sharp contrast, blends in Examples 8–11 had tensile strengths less than one polymer component. In Example 8 an EP polymer was used having a Mooney viscosity of only 20, instead of the 25 to 110 value required (ML 1+8 at 125° C.). In Examples 9–11, none of the EP polymers had proper ethylene content or unstretched crystallinity (all three EP polymers were amorphous). The blends of Examples 8–11 are outside the scope of the present invention, and no blend in the latter examples has a tensile strength higher than either polymer component.

Test data for Examples 5–11 is set forth in Table IV.

EXAMPLES 12–14

In each of examples 12 and 13 the tensile strength of the blend is higher than that of any polymer component. All EPDM and EP polymers in Examples 12 and 13 had ethylene content, unstretched crystallinity and Mooney viscosity within ranges specified heretofore.

On the other hand, the EPDM-11 polymer used in example 14 was an amorphous polymer (no unstretched crystallinity) having an ethylene content outside the 63–85 wt.% range specified heretofore. The blend in example 14 was outside the scope of the present invention, and it did not have a tensile strength greater than either polymer component.

Test data for Examples 12–14 is summarized in Table V.

TABLE V

EPDM-EP Blends

| | Tensile Strength of Polymer, psi | Blend Number | | |
|---|---|---|---|---|
| | | 12 | 13 | 14 |
| EPDM-1 | 1400 | 100 | — | — |
| EPDM-2 | 680 | — | 100 | — |
| EPDM-11 | 110 | — | — | 100 |
| EP-6 | 1440 | 50 | 50 | 50 |
| Blend | | | | |
| Tensile Strength, psi | — | 2700 | 1800 | 530 |
| Greater than Predicted | — | yes | yes | no |

TABLE IV

EPDM-EP Blends

| | Tensile Strength of Polymer, psi | Blend Number | | | | | | |
|---|---|---|---|---|---|---|---|---|
| | | 5 | 6 | 7 | 8 | 9 | 10 | 11 |
| EPDM-1 | 1400 | 100 | 100 | 100 | 100 | 100 | 100 | 100 |
| EP-6 | 1440 | 50 | — | — | — | — | — | — |
| EP-8 | 1415 | — | 100 | — | — | — | — | — |
| EP-9 | 800 | — | — | 50 | — | — | — | — |
| EP-12 | 220 | — | — | — | 50 | — | — | — |
| EP-13 | 30 | — | — | — | — | 50 | — | — |
| EP-14 | 15 | — | — | — | — | — | 50 | — |
| EP-15 | 130 | — | — | — | — | — | — | 50 |
| Blend | | | | | | | | |
| Tensile Strength, psi | | 2150 | 1920 | 1500 | 1395 | 920 | 925 | 1215 |
| Greater than Predicted | | yes | yes | yes | no | no | no | no |

EXAMPLES 15-18

Both polymer components of the blend in example 15 had ethylene content, unstretched crystallinity, and Mooney viscosity within the ranges specified heretofore. The tensile strength of the blend is higher than that of either polymer component.

Example 16 demonstrates that the optional polyethylene (PE) third component defined heretofore improved blend tensile strength further. The example 16 blend has a tensile strength greater than any of the three polymer components. Moreover, example 16 demonstrates that the optional PE component substantially improved blend tensile strength beyond that for two-component blends of either EDPM and EP polymers (example 15), or EPDM polymer and a low density polyethylene (example 17; see also U.S. Pat. No. 3,919,358, which is directed to blends of polyethylenes and certain EPDM polymers, which blends exhibit superior tensile strength).

Example 18 demonstrates that a blend of an ethylene-propylene (EP) polymer with polyethylene did not have the unexpectedly high tensile strength that characterizes the blends of the present invention.

Test data for examples 15-18 is set forth in Table VI.

TABLE VI
EPDM-EP, EPDM-EP-PE, EPDM-PE and EP-PE Blends

|  | Tensile Strength of Polymer, psi | Blend Number | | | |
| --- | --- | --- | --- | --- | --- |
|  |  | 15 | 16 | 17 | 18 |
| EPDM-1 | 1638 | 100 | 100 | 100 | — |
| EP-7 | 750 | 100 | 100 | — | 100 |
| NA-301+ | 1900 | — | 20 | 10 | 10 |
| Blend |  |  |  |  |  |
| Tensile Strength, psi | — | 2040 | 2725 | 2300 | 950 |
| Greater than Predicted | — | yes | yes | yes | no |

+A low density polyethylene sold by USI Chemicals as NA301PE.

We claim:
1. A thermoplastic polymer blend comprising
   (1) 100 weight parts of at least one EPDM polymer consisting essentially of interpolymerized units of about 63 wt.% to about 85 wt.% ethylene, about 5 wt.% to about 37 wt.% propylene, and about 1 wt.% to about 15 wt.% of a diene monomer, said EPDM polymer having an unstretched crystallinity from about 1 to about 20 wt.% based upon EPDM polymer weight, and a Mooney viscosity from about 25 to about 110 (ML 1+8 at 125° C.), and
   (2) from about 5 weight parts to 500 weight parts of at least one ethylene-propylene (EP) polymer consisting essentially of interpolymerized units of about 63 wt.% to about 85 wt.% ethylene, and about 15 wt.% to about 37 wt.% propylene, said EP polymer having an unstretched crystallinity from about 1 to about 20 wt.% based upon EP polymer weight, and a Mooney viscosity from about 25 to about 110 (ML 1+8 at 125° C.).

2. A thermoplastic polymer blend of claim 1 wherein the EPDM polymer consists essentially of interpolymerized units of about 68 wt.% to 78 wt.% ethylene, 17 wt.% to 31 wt.% propylene, and 2 wt.% to 10 wt.% of a nonconjugated diene monomer containing from 5 to about 25 carbon atoms in the monomer.

3. A thermoplastic polymer blend of claim 2 wherein the nonconjugated diene is an alkenyl norbornene.

4. A thermoplastic polymer blend of claim 3 wherein the alkenyl norbornene is 5-ethylidene-2-norbornene.

5. A thermoplastic polymer blend of claim 3 wherein from about 20 to about 300 weight parts of EP polymer is used per 100 weight parts of EPDM polymer.

6. A thermoplastic polymer blend of claim 2 wherein the nonconjugated diene is 1,4-hexadiene.

7. A thermoplastic polymer blend of claim 2 wherein from about 5 weight parts to about 200 weight parts of at least one polyethylene is used per 100 weight parts of EPDM polymer.

8. A thermoplastic polymer blend of claim 7 wherein the nonconjugated diene is an alkenyl norbornene.

9. A thermoplastic polymer blend of claim 8 wherein the alkenyl norbornene is 5-ethylidene-2-norbornene.

10. A thermoplastic polymer blend of claim 7 wherein from about 20 to about 300 weight parts of EP polymer is used per 100 weight parts of EPDM polymer.

11. A thermoplastic polymer blend of claim 7 wherein the nonconjugated diene is 1,4-hexadiene.

* * * * *